United States Patent Office
3,335,820
Patented Aug. 15, 1967

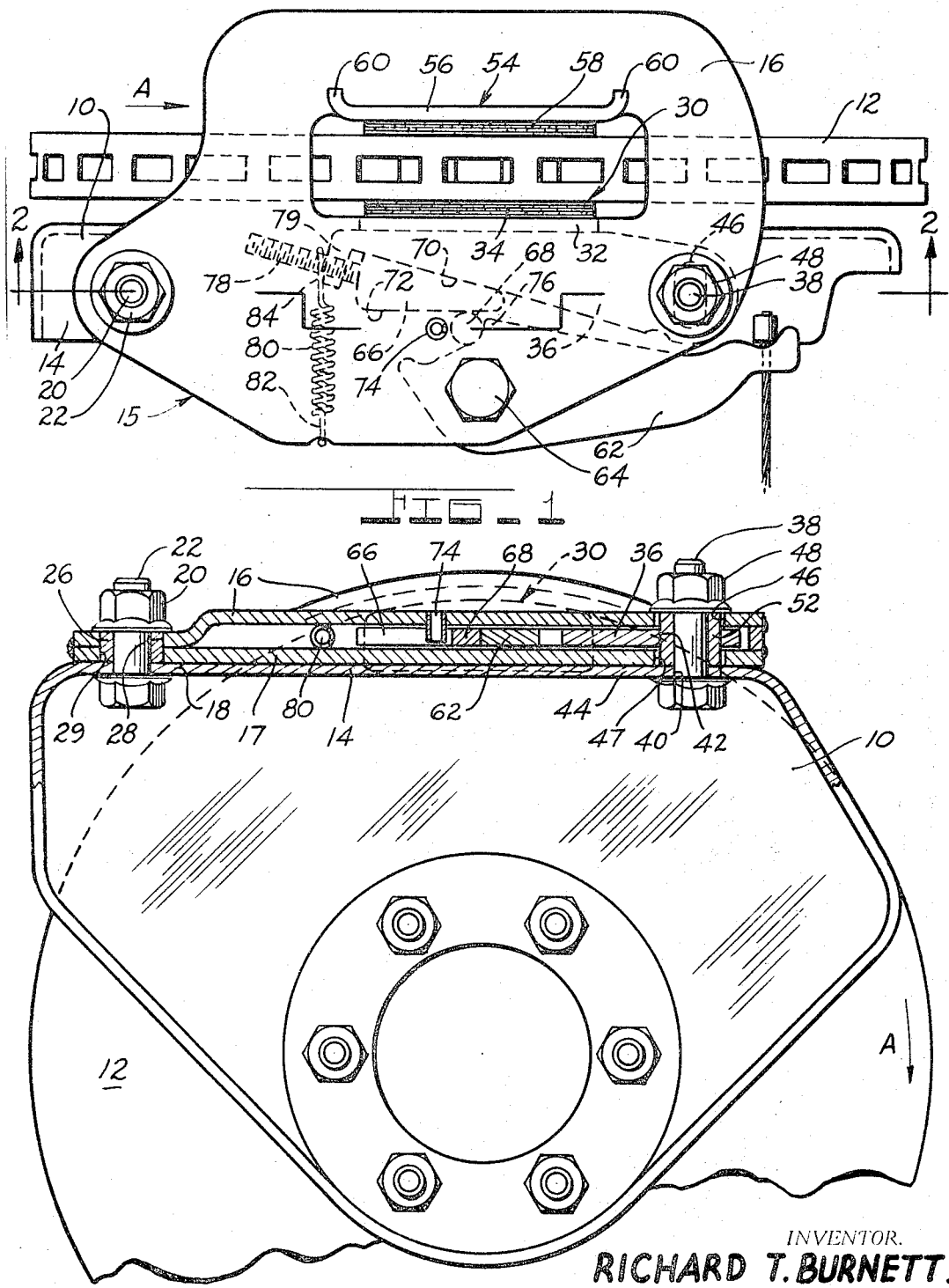

3,335,820
CLOSED LOOP TYPE DISC BRAKE AND ADJUSTER
Richard T. Burnett, South Bend, Ind., assignor to The Bendix Corporation, South Bend, Ind., a corporation of Delaware
Filed Aug. 11, 1965, Ser. No. 478,829
3 Claims. (Cl. 188—73)

This invention relates to a disc brake.

An object of this invention is to contruct a disc brake wherein a caliper swings on a support member and carries one brake shoe for engaging one side of the disc and a brake shoe for engaging the other side of the disc is pivotally connected directly to the support member.

Another object of this invention is to construct a disc brake wherein the load exerted by the disc on the pivotally supported brake shoe engaging one side of the disc is transferred directly by the shoe to a portion of the support member which is located circumferentially on one side of the center of applying pressure and the load exerted by the disc on the swinging caliper supported brake shoe engaging the other side of the disc is transferred by the shoe into the caliper and thereby to a portion of the support member which is located circumferentially on the other side of the center of applying pressure.

Still another object of this invetnion is to provide means for adjusting the relative positions between an actuating lever and a brake shoe.

Other objects will become apparent from the following description with reference to the drawings wherein:

FIGURE 1 is a plan view of a brake assembly; and
FIGURE 2 is a view taken along section line 2—2 of FIGURE 1.

Referring to FIGURES 1 and 2, a brake for parking or emergency application is shown. A support bracket 10 extends along one side of a disc 12 and is secured to a stationary part of a vehicle, such as an axle flange, and includes a torque taking flange 14 extending transversely to the disc 12. A closed loop caliper 15 comprises a stamping 16 embracing the disc 12 and a stamping 17 located on one side of the disc 12 and welded to the stamping 16. The caliper is pivotally secured to a portion 18 of the flange 14 by an anchor bolt 20 and nut 22 assembly. A spacer bushing 26 is thicker than stampings 16 and 17 and surrounds anchor bolt 20 to prevent the stampings from being tightly clamped against the portion 18 of the flange 14. The edge of openings 28 and 29 pivotally bear on the bushing 26.

A brake shoe 30 comprises a backing plate 32, lining 34 secured to the backing plate, and a transverse web 36 welded at one end to the backing plate. An anchoring bolt 38 extends through openings 40 and 42 in a flange portion 44 and web 36, respectively, and through oversized slots 46 and 47 in the stamping 16. A nut 48 is secured to the bolt 38 to maintain the web 36 and thereby the shoe 30 pivotally secured to the anchor bolt 38. A spacer bushing 52 surrounds the bolt 38 to prevent the stamping 16 and web 36 from being tightly clamped against the portion 44 of the flange 14. The edge of the opening 40 in the web 36 pivotally bears on the bushing 52. The edge of slots 46 and 47 do not engage the bushing 52 in order that the torque on the caliper 15 will be transferred solely to the anchor bolt 20. A brake shoe 54 is located on the other side of the disc 12 and comprises a backing plate 56 and a friction lining 58. A pair of slotted ears 60 are turned back from the backing plate and embrace the stamping 16 thereby fixing the shoe 54 to the stamping for movement therewith.

A mechanically actuated lever 62 is located between the stampings 16 and 17 and pivotally connected thereto by a stud and nut assembly 64. A wedge 66 and a roller 68 are slidably received between the stamping 16 and 17. The wedge 66 engages the edge 70 of the web 36 and the roller 68 engages the edge 72 of the wedge 66 and the lever 62 to transmit thrust from the lever 62 to the shoe 30. The roller 68 is maintained in position by the wedge 66, a roll pin 74 carried by the stamping 16 and an extension 76 on the lever 62. A screw 78 is threaded into a projection 79 on the web 36 and engages the wedge for adjusting the position thereof relative to the shoe 30. The primary purpose of the adjustable wedge is for initial setting of the brake shoe 30 relative to the actuating lever 62 although it may be used to effect adjustment as lining wears. Since the wedge 66 is adjustable, close manufacturing tolerances do not have to be kept to obtain a certain relative position between the shoe 30 and lever 62. A spring 80 is hooked at one end 82 onto the stamping 16 and at its other end 84 into the screw 78 for returning the shoe 30 to its released position.

In operation, assuming rotation of the disc 12 in the direction of arrow A, the lever 62 is rotated to press shoe 30 into engagement with the disc 12. At the same time, the lever 62 reacts on the shoe 30 and effects pivoting of the caliper 15 to bring shoe 54 into engagement with the disc 12. The disc 12 tends to carry the shoe therewith resulting in wedging the shoe 30 between the anchor bolt 38 and the disc 12 thereby effecting a self-energizing action. The load exerted by the disc 12 on the shoe 30 is transferred by the web into the anchor bolt 38 and into the anchor flange 14. The shoe 54 is also self-energizing and the load exerted by the disc 12 on the shoe 54 is transferred by the caliper 15 to the anchor bolt 20 and into the anchor flange 14. The operation is the same during braking while the disc 12 is rotating in the opposite direction except there is no self-energizing action on the shoes 30 and 54.

Since the anchor bolts 20 and 38 are located on the opposite sides of the center of applying pressure F (or the effective connection between the applying lever 62 and shoe 30), and each bolt only takes the anchoring load of one shoe, the support plate flange 14 may be thinner than if the same portion thereof had to take the anchoring load of both shoes.

Although a mechanically actuated brake for parking or emergency is illustrated, it should be realized that a hydraulic service brake may be constructed utilizing the same load distribution as the above described brake assembly.

While the invention has been described in considerable detail, it is my intention to include all equivalent modifications within the scope of the following claims:

1. In a disc brake: a rotor having a pair of opposed annular braking surfaces thereon, a stationary support member opposite one side of said rotor, a housing, said housing including a first portion extending opposite one side of said rotor, a second portion extending opposite the other side of said rotor, and means extending across the periphery of said rotor interconnecting said first and second portions, a first anchor member secured to said support member, means pivotally mounting said housing to said first anchor member, a second anchor member secured to said support member at a location circumferentially spaced from said first anchor member, the axis of said second anchor member being generally parallel to the axis of said first anchor member, a first friction member pivotally mounted on said second anchor member for movement into engagement with one of said braking surfaces, a second friction member carried by said housing for movement into engagement with the other of said braking surfaces, said support member comprising flange means extending in a direction generally perpendicular to said anchor members and said friction surfaces, said anchor members comprising a pair of bolt-like elements one of which is effectively secured to said flange means and said housing and the other of which is effectively secured to said flange means and said first friction member, actuating means carried by said housing, said actuating means including an applying lever and a slidable wedge shaped member interposed between and operatively connected to said first friction member and said lever at a location circumferentially between said anchor members for transmitting an applying thrust from said lever to said first friction member and for effecting movement of said housing to bring said second friction member into engagement with its respective braking surface, whereby the force exerted on said first friction member by said rotor is transferred directly to said second anchor member and the force exerted on said second friction member by said rotor is transferred through said housing to said first anchor member, and means operatively connected to said first friction member and said wedge member for sliding said wedge member relative to said lever and said first friction member to adjust the relative position between said first friction member and said lever.

2. The structure, as recited in claim 1, wherein a roller is interposed between and engages said wedge member and said lever for transmitting applying thrust from said lever to said wedge member.

3. The structure, as recited in claim 1, wherein said last mentioned means for sliding said wedge member comprises a member threadedly connected to said first friction member and having one end thereof engaging said wedge member.

References Cited

UNITED STATES PATENTS

| 1,132,903 | 3/1915 | Beck | 188—196 |
| 3,199,634 | 8/1965 | Chouings | 188—73 |
| 3,241,638 | 3/1966 | Troy | 188—196 |

MILTON BUCHLER, *Primary Examiner.*

G. E. A. HALVOSA, *Assistant Examiner.*